(12) United States Patent
Iwasaki

(10) Patent No.: US 9,967,388 B2
(45) Date of Patent: May 8, 2018

(54) MIRRORED INTERFACE NAVIGATION OF MULTIPLE USER INTERFACES

(75) Inventor: Jill S. Iwasaki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 13/400,873

(22) Filed: Feb. 21, 2012

(65) Prior Publication Data

US 2013/0219285 A1 Aug. 22, 2013

(51) Int. Cl.
| | |
|---|---|
| G06F 3/00 | (2006.01) |
| H04M 1/725 | (2006.01) |
| G06F 3/0483 | (2013.01) |
| G06F 3/01 | (2006.01) |
| G06F 3/0481 | (2013.01) |
| H04L 29/08 | (2006.01) |
| G06F 9/44 | (2018.01) |

(52) U.S. Cl.
CPC ........... *H04M 1/7253* (2013.01); *G06F 3/011* (2013.01); *G06F 3/0481* (2013.01); *G06F 3/0483* (2013.01); *G06F 9/4445* (2013.01); *H04L 29/08072* (2013.01)

(58) Field of Classification Search
USPC ................................ 715/737, 740, 748, 746
See application file for complete search history.

(56) References Cited

U.S. PATENT DOCUMENTS

| | | | |
|---|---|---|---|
| 7,899,915 B2 | 3/2011 | Reisman | |
| 7,991,916 B2 | 8/2011 | Meek et al. | |
| 2008/0220744 A1* | 9/2008 | Rydgren et al. | 455/411 |
| 2008/0313545 A1 | 12/2008 | Patel et al. | |

(Continued)

FOREIGN PATENT DOCUMENTS

| | | |
|---|---|---|
| CN | 102123197 A | 7/2011 |
| JP | 2001175449 A | 6/2001 |

(Continued)

OTHER PUBLICATIONS

Dong-Ik Ko et al., Gesture recognition: first step toward 3D UIs, Dec. 2011, United Business Media LLC, vol. 24.*

(Continued)

*Primary Examiner* — Tam Tran
(74) *Attorney, Agent, or Firm* — Norton Rose Fulbright LLP

(57) ABSTRACT

Mirrored interface navigation is disclosed between two or more mobile devices with similar capabilities. When a connection is established between the mobile devices, interface navigation actions detected on a first of the connected devices are transmitted to the other devices. The other devices receive and execute those interface navigation actions to perform parallel interface navigation with the first mobile device. For example, two smart phones are connected for shared interface navigation, interface navigation actions performed on the first smart phone are translated to the second smart phone to perform mirrored parallel interface navigation. The mirrored parallel interface navigation may occur regardless of device type or specific application, such that interface navigation actions on an Apple, Inc., IPHONE® may result in parallel interface navigation on a Google ANDROID®-based phone to similar application types.

24 Claims, 4 Drawing Sheets

(56) References Cited

U.S. PATENT DOCUMENTS

| | | |
|---|---|---|
| 2008/0320397 A1 | 12/2008 | Do et al. |
| 2009/0248820 A1 | 10/2009 | Basir et al. |
| 2010/0293462 A1* | 11/2010 | Bull et al. .................. 715/716 |
| 2011/0041083 A1 | 2/2011 | Gabai et al. |
| 2011/0044438 A1 | 2/2011 | Wang et al. |
| 2011/0156944 A1* | 6/2011 | Ward .............. H04L 12/2832 341/176 |
| 2012/0042102 A1* | 2/2012 | Chung et al. ................ 710/33 |
| 2012/0075204 A1* | 3/2012 | Murray et al. ............. 345/173 |

FOREIGN PATENT DOCUMENTS

| | | |
|---|---|---|
| JP | 2001298676 A | 10/2001 |
| JP | 2003308065 A | 10/2003 |
| JP | 2007219949 A | 8/2007 |
| JP | 2009237895 A | 10/2009 |
| JP | 2010268497 A | 11/2010 |
| JP | 2011028501 A | 2/2011 |
| JP | 2011086293 A | 4/2011 |
| TW | 200901033 A | 1/2009 |
| WO | WO2011107656 A1 | 9/2011 |

OTHER PUBLICATIONS

Roy Bryant, Adavances in virtual instrumentation: PC-based systems speed design, Mar. 12, 1997, EDN, vol. 42.*
Yi-Chin Wang, Development and Future Trends for Mobile Phone Information Security, Dec. 2007, MIC, pp. 1-22.*
Dong-Her Shih et al., Security aspects of Mobile Phone virus: a critical survey, Dec. 30, 2007, IMDS, vol. 108, pp. 478-494.*
International Search Report and Written Opinion—PCT/US2013/026460—ISA/EPO—May 7, 2013.
Taiwan Search Report—TW102105568—TIPO—Feb. 6, 2015.
Navitime Japan: "Navitime Drive Supporter App for iPhone Launched", Mar. 2, 2011, URL: http://corporate.navitime.co.jp/topics/pr/201103/02_1693.html, 6 pages.
Navitime Japan: "Navitime Drive Supporter App for the Android Phone Launched on Sep. 17 2010", Aug. 24, 2010, URL:http://corporate.navitime.co.jp/topics/pr/201008/24_721.html, 6 pages.

* cited by examiner

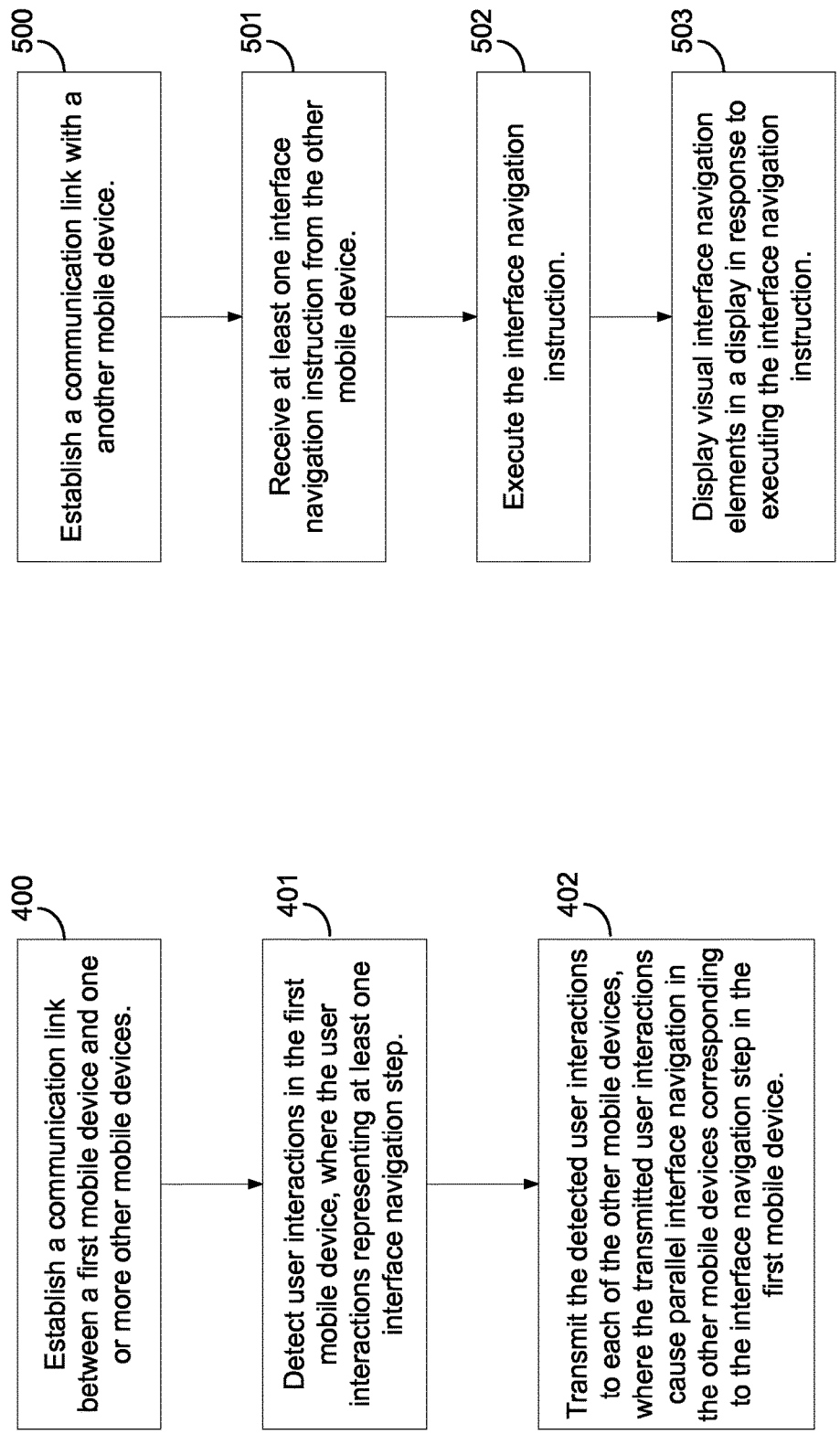

MIRRORED INTERFACE NAVIGATION OF MULTIPLE USER INTERFACES

BACKGROUND

Field

Aspects of the present disclosure relate generally to electronic user interfaces, and more particularly, to mirrored interface navigation of multiple user interfaces.

Background

Over the last number of years, the availability and market penetration of mobile electronics into society has greatly increased. Smart phones are quickly outpacing voice-only mobile phones or enhanced feature phones in sale and placement into the market. In addition to smart phones, people are obtaining tablet computers, notebook and netbook computers, and other portable computing devices to supplement communication, productivity, life organization, and maintaining connectivity to social media.

Many current mobile electronic devices provide operational platforms for supplemental applications, whether provided through independent third parties, network operators, manufacturers, or the like. Thus, in addition to maintaining a calendar, email access, internet access, and communication functionalities, many such modern electronic devices provide computer platforms for various types of applications, such as supplemental communication applications, games and entertainment, social media applications, visual media development environments, productivity applications, and the like.

One of the reasons behind the growth in such mobile electronics is the desire to remain connected to other people. Friends may interact through social media, short messaging service (SMS) or text messages, email, and the like. Families may remain connected similarly and also coordinate schedules, todo lists, shopping lists, and the like. However, while such advanced mobile electronics are becoming an increasing part of everyday life, not every owner of an advanced mobile electronic device is familiar with all aspects and functionalities of the device. Therefore, difficulties may arise when communicating with or coordinating connections with other people in electronic circle of friends, family, or co-workers.

SUMMARY

Representative aspects of the present disclosure are directed to mirrored interface navigation between two or more mobile devices with similar capabilities. When a connection is established between the two or more mobile devices, actions performed to navigate on a first of the connected devices are translated to other of the connected devices to navigate the other connected devices in parallel with the first mobile device. For example, two smart phones are connected for shared interface navigation. Interface navigation actions performed on the first smart phone are translated to the second smart phone to perform mirrored parallel interface navigation. The mirrored parallel interface navigation may occur regardless of device type or specific application, such that interface navigation actions on an Apple, Inc., IPHONE® may result in parallel interface navigation on a Google ANDROID®-based phone to similar application types.

In one aspect of the disclosure, a method for mirrored interface navigation on multiple mobile devices includes a first mobile device establishing a communication link between the first mobile device and one or more other mobile devices, detecting user interactions with the first mobile device, where the user interactions represent at least one interface navigation step, and transmitting the detected user interactions from the first mobile device to each of the other mobile devices, where the transmitted user interactions cause parallel interface navigation corresponding to the at least one interface navigation step in the first mobile device.

In an additional aspect of the disclosure, a method for mirrored interface navigation on multiple mobile devices includes establishing a communication link with a first device, receiving at least one interface navigation instruction from the first device, executing the interface navigation instruction, and displaying visual interface navigation elements in a display in response to executing the interface navigation instruction.

In an additional aspect of the disclosure, an electronic apparatus including means, executable by the first mobile device, for establishing a communication link between the first mobile device and one or more other mobile devices, means for detecting user interactions with the first mobile device, where the user interactions represent at least one interface navigation step, and means for transmitting the detected user interactions from the first mobile device to each of the other mobile devices, where the transmitted user interactions cause parallel interface navigation corresponding to the interface navigation step in the first mobile device.

In an additional aspect of the disclosure, an electronic apparatus for mirrored interface navigation on multiple mobile devices includes means for establishing a communication link with a first device, means for receiving at least one interface navigation instruction from the first device, means for executing the interface navigation instruction, and means for displaying visual interface navigation elements in a display in response to the means for executing the interface navigation instruction.

In an additional aspect of the disclosure, a computer program product has a computer-readable medium having program code recorded thereon. This program code includes code to establish a communication link between a first mobile device and one or more other mobile devices, code to detect user interactions in the first mobile device, where the user interactions represent at least one interface navigation step, and code to transmit the detected user interactions to each of the other mobile devices, where the transmitted user interactions cause parallel interface navigation corresponding to the interface navigation step in the first mobile device.

In an additional aspect of the disclosure, a computer program product has a computer-readable medium having program code recorded thereon. This program code includes code to establish a communication link with a first device, code to receive at least one interface navigation instruction from the first device, code to execute the interface navigation instruction, and code to display visual interface navigation elements in a display in response to execution of the interface navigation instruction.

In an additional aspect of the disclosure, an apparatus includes at least one processor and a memory coupled to the processor. The processor is configured to establish a communication link between a first mobile device and one or more other mobile devices, to detect user interactions in the first mobile device, where the user interactions represent at least one interface navigation step, and to transmit the detected user interactions to each of the other mobile devices, where the transmitted user interactions cause parallel interface navigation corresponding to the at least one interface navigation step in the first mobile device.

In an additional aspect of the disclosure, an apparatus includes at least one processor and a memory coupled to the processor. The processor is configured to establish a communication link with a first device, to receive at least one interface navigation instruction from the first device, to execute the interface navigation instruction, and to display visual interface navigation elements in the display device in response to execution of the interface navigation instruction.

BRIEF DESCRIPTION OF THE DRAWINGS

FIG. 4 is a functional block diagram illustrating example blocks executed to implement one aspect of the present disclosure.

FIG. 5 is a functional block diagram illustrating example blocks executed to implement one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
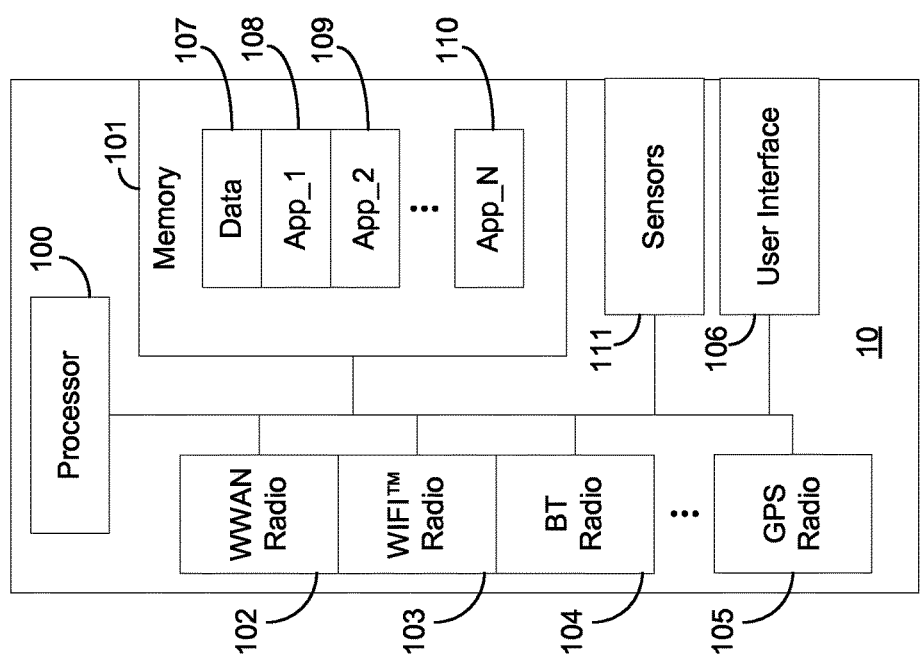
FIG. 1 is a block diagram illustrating a mobile device configured according to one aspect of the present disclosure.

FIG. 1 is a block diagram illustrating a mobile device 10 configured according to one aspect of the present disclosure. Mobile device 10 includes various components common to many typical smart phones, tablet computers, notebook and netbook computers, and the like. The functionality and operations of mobile device 10 are controlled and executed through processor 100. Processor 100 executes program logic, whether implemented through software stored in a memory 101 or in firmware in which logic is integrated directly into integrated circuit components. Mobile device 10 may provide communication through multiple radios, such as wireless wide area network (WWAN) radio 102, wireless local area network (WLAN) radios, such as WIFI™ radio 103 and BLUETOOTH® radio 104, and other types of radios, such as global positioning system (GPS) radio 105. WWAN radio 102 generally allows a user to communicate over a long range wireless communication network such as 3G, 4G, LTE, and the like. The WLAN radios, WIFI™ radio 103 and BLUETOOTH® radio 104, allow communication over a shorter range. GPS radio 105 allows for communication between the device and interface navigational satellites that are a part of the GPS system.

Under control of processor 100, executed program logic stored on memory 101 provides control of the various radios for communication. Other program logic, including data 107, application_1 108-application_N 110, provides additional functionality that may supplement the communication aspects of mobile device 10 or may provide unrelated functionality. For example, applications stored in memory 101 may, when executed by processor 100, operate a calendar program, a game program, a list program, a social media program, and the like. Such operating applications are displayed visually to the user via user interface component 106. The user interface 106 controls the rendering of visual information onto the display screen of the mobile device (not shown). The user interface component 106, under control of the processor 100, controls and operates all forms of interfaces between the user and mobile device 10. Thus, for example, when implemented using a touch screen display, user interface component 106 reads the user's input and finger motions on the touch screen and translates those movements or gestures into electronic interface navigational commands. Various aspects of user interface component 106 also will receive the rendered visual data through processing, controlled by processor 100, and display that visual information on the display. Thus, during input to a touch screen device, the user interface component 106 may be receiving and analyzing input data from a user's finger movements and gestures on the display screen. It may also be receiving data from the processor 100 in the form of processed visual or sound data to be output by display to the user, some of which may be to reflect movement of screen objects in response to the user's finger movements.

Mobile device 10 also includes sensors 111, under control of processor 100. Sensors 111 may include multiple sensors for sensing various things. For example, one common sensor that may be included in sensors 111 is an accelerometer. An accelerometer is able to gauge the precise movement of the mobile device 100. By measuring these precise movements, logic executing by processor 100 may determine the precise movements and orientation of mobile device 100. Additional sensors that may be included in the sensors component 111 may be a gyroscope, a proximity sensor, heat sensor, light sensor, or the like. The input to and output from these various sensors in sensors component 111 may be use for various applications stored in memory 101.

One application stored in memory 101, (e.g., application_2 109) as defined according to one aspect of the present application controls interface navigation communication with other mobile devices. On execution of this interface navigation communication application by the processor 100, the executing application seeks a communication link with at least one other mobile device. This communication link may be established using any one of the communication radios.

Mobile device 10 may establish a long range connection over the WWAN radio 102, or may establish a short range connection over one of the WLAN radios, WIFI™ radio, and BLUETOOTH® radio. Moreover, the mobile device 10 may know the target mobile device that it wishes to connect with, in which case a probe request may be transmitted that is addressed to the specific target mobile device either through a centralized network or internet connection or using a peer-to-peer (P2P) connection. In other scenarios, the mobile device 10 may attempt to force a connection with an unknown device by starting the interface navigation application and broadcasting a communication request signal. If the target mobile device is configured to recognize and respond to the probe request, it may respond and then form a communication link between the two devices. The target communication device will starts an instance of the interface navigation application that it has stored locally. As the target or receiving party in the communication, the target device will switch into a listening mode with regard to its connection with mobile device 10.

Once the one or more mobile devices are in communication with the other devices operating in a listening mode, the user of mobile device 10 may direct interface navigation on each device, as long as the other devices are basically compatible. When the user generates movements or gestures on mobile device 10, the interface navigation application operating on mobile device 10 captures those interface navigation gestures that cause certain actions on the mobile device. These interface navigation gestures are then packaged into a message that is transmitted to the one or more other connected mobile devices. On receipt of these messages by one of the other connected mobile devices, the running interface navigation application translates the interface navigation message into representative interface navigation commands compatible with the current mobile device. These converted interface navigation commands are then immediately executed on the receiving mobile device creating a near simultaneous mirrored interface navigation operation with the operation performed by the user on the first mobile device, mobile device 10. As a result, interface navigation movements are made on the connected mobile device that mirror the interface navigation actions on the user's device, such as mobile device 10. Such interface navigation movements may include manipulating the interface display to zoom the display, change displays, activate an application, establish and internet or communication connection, and the like. When the mirrored interface navigation session is over, the communication link is broken between the devices. However, the devices that were manipulated through the interface navigation signals received over the communication link will remain in the state that the mirrored interface navigation has taken the device. For example, if the interface navigation signals cause the mobile device to have navigated into a game application or to an internet access page and a search engine to search for a particular term, even after tearing down the communication link of the mirrored communication session, the interface of the target mobile device will remain in that game application or search engine page.

Figure 2:
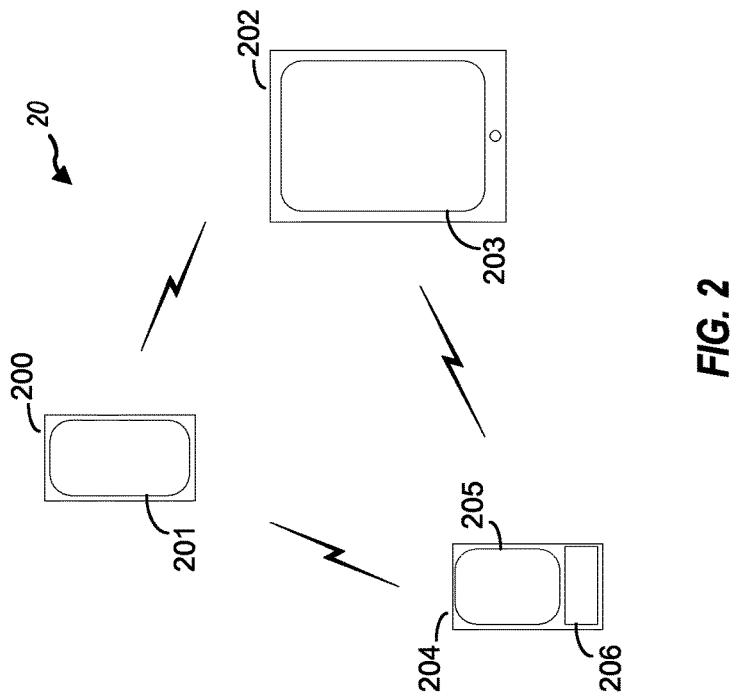
FIG. 2 is a block diagram illustrating an example connection configured according to one aspect of the present disclosure.

FIG. 2 is a block diagram illustrating an example connection 20 configured according to one aspect of the present disclosure. Connection 20 includes an ad hoc, P2P network between three mobile devices, mobile device 200, having a display 201, mobile tablet computer 202, having a display 203, and mobile device 204, having a display 205 and a keypad 206. When a mirrored interface navigation session is desired, each user activates the interface navigation application located on each device. Activating the device will initiate communication probes between mobile devices 200 and 204, and mobile tablet computer 202. These communication probes establish the translators for translating the interface navigation signals received from the leading mobile device into local interface navigation commands and establishes the temporary caches where the received signals are temporarily stored while processing the corresponding interface navigation instructions or commands to cause the mirrored interface navigation.

It should be noted that, in additional aspects of the present disclosure, communication between the participating mobile devices, such as mobile devices 200 and 204 and mobile tablet computer 202, may be accomplished using the short-ranged WLAN radios, such as the WIFI™ radio 103 and the BLUETOOTH® radio, or may be established over the longer-ranged WWAN radio 102. It should further be noted that various methods may be used to establish the communication connection between the devices. In one additional example aspect, activating the interface navigation application on one of the mobile devices begins signaling from this mobile device to other mobile devices. When the other mobile devices receive these signals, the mobile device reacts to the signals by initiating the interface navigation application stored on those receiving mobile devices.

In operation, the user of mobile device 200 initiates the mirrored interface navigation application to direct each of mobile tablet computer 202 and mobile device 204 to a lists application. Once the communication link is established, the user of mobile device 200 enters input and manipulates mobile device 200 including interactions with display 201, to navigate to the list application. The transmitted interface navigation instructions cause the mobile tablet computer 202 and mobile device 204 to also navigate to the lists application. The interface navigation elements and animations each are displayed on displays 203 and 205, respectively. With the list application displayed on each of displays 201, 203, and 205, the users begin entering data onto the list. Each of the users may enter data directly into mobile devices 200 and 204 and mobile tablet computer 202. The combined lists will then be stored locally on each of mobile devices 200 and 204 and mobile tablet computer 202.

It should be noted that in additional aspects of the disclosure, only the first mobile device may be able to provide input during the mirrored interface navigation session. In such aspects, a locking signal would be transmitted to the other devices to prevent the other users from adding input during the session.

Figure 3:
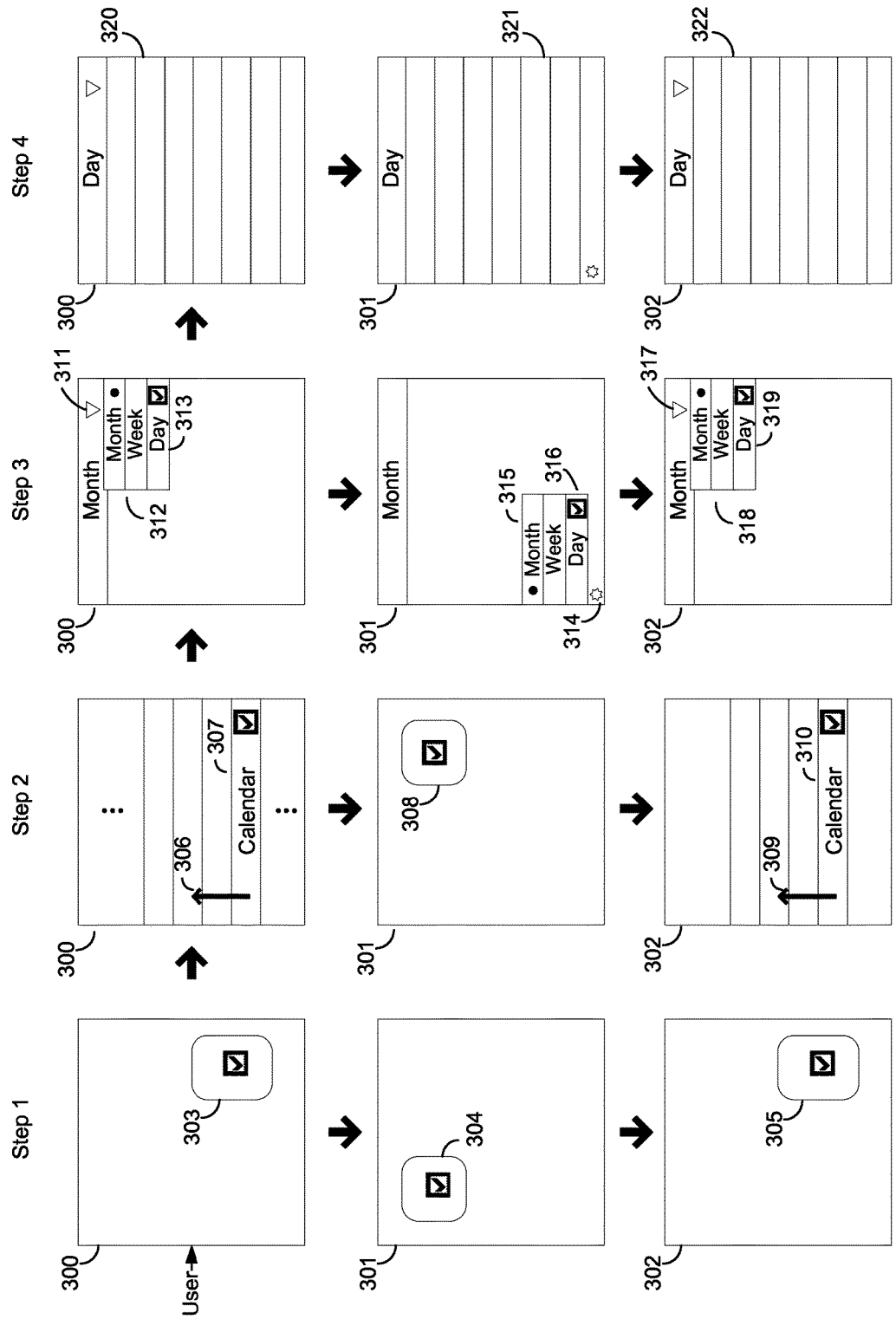
FIG. 3 is a progression diagram illustrating a sequence of screenshots for three mobile devices in communication for parallel mirrored interface navigation.

FIG. 3 is a progression diagram illustrating a sequence of screenshots for three mobile devices in communication for parallel mirrored interface navigation. Display interface 300 belongs to a first mobile device operated by the user. The user desires to establish a communication connection for mirrored interface navigation between the first mobile device having display interface 300 and mobile devices associated with display interfaces 301 and 302. In the example aspect illustrated in FIG. 3, the communication link is a centralized link through a WWAN data connection. Starting the mirrored interface navigation application on the first device, a communication connection with the other devices is initiated. Once a communication link is established, the user will manipulate display interface 300 causing the mobile device of display interface 300 to transmit interface navigation messages containing a set of interface navigation commands for implementation on the target devices. The communication link with the other devices triggers the activation of a counterpart mirrored interface navigation application on those other devices. Therefore, when received by the target devices, interface navigation commands are interpreted by the running mirrored interface navigation application and executed on the target device without physical manipulation of that target device. As a part of setting up the communication link, the mirrored interface navigation application running on the first mobile device sends signals to the other mobile devices locking out any user input interfaces. The display interfaces 301 and 302 of the target devices will display the interface navigation sequences according to their own programming that mirror the interface navigation as manipulated by the user on the display interface 300 of the first mobile device. However, because the input interfaces of the other devices are locked out, the other users may not provide direct input while the mirrored interface navigation is ongoing.

In Step 1, the user selects a contacts manager icon 303 displayed on display interface 300. The checkmarks illustrated in FIG. 3 represents the selection point on the display interfaces 300-302. Interface navigation input, in the form of the detected selection of contacts manager icon 303, is captured by the mirrored interface navigation application running on the first mobile device. The interface navigation input is converted into interface navigation instructions and transmitted to the other mobile devices. The corresponding mirrored interface navigation applications on the other devices interpret these received interface navigation instructions, mapping them to corresponding interface navigation commands according to the operating systems running on the devices. As a part of Step 1, the interface navigation commands executed at the other mobile devices result in the contacts manager icon 304 displayed in display interface 301 to be selected and the contacts manager icon 305 displayed in the display interface 302 to be selected. The users at each of the other mobile devices would observe contacts manager icons 304 and 305, respectively, appearing to be selected without themselves interacting with their mobile devices.

As illustrated in FIG. 3, the mobile device having display interface 302 is of the same type as the first mobile device having display interface 300. Therefore, the interface navigation actions and commands are the same. The mobile device having display interface 301 is a different type. While it has similar interface navigation actions and commands, they will not appear identical to the interface navigation displayed on display interfaces 300 and 302. However, the interface navigation action, selecting a contacts manager icon, will be executed on all three devices.

In response, to selecting the contacts manager icons 303-305, the viewing image displayed on display interfaces 300-302 changes to the home screen of the contacts manager application, as shown in Step 2. Further in Step 2, the user of the first mobile device runs his or her finger along the surface of display interface 300 in the direction 306 to scroll through the menu of the contacts manager application. When the calendar entry 307 is within the viewable area of display interface 300, the user selects it. The scrolling and selecting interface navigation instructions are transmitted and received by the other devices and mapped into local interface navigation commands. The home screen of the contacts manager application on the mobile device having display interface 301 displays a series of different icons, which is different than the home screen display for display interfaces 300 and 302. Therefore, when translating the interface navigation instructions into local interface navigation commands, the device manipulates the home screen to display the calendar icon 308 in the contacts manager application. The local interface navigation commands then select the calendar icon 308 as may be observed on display interface 301. Similarly, the interface navigation instructions are mapped into local interface navigation commands for display interface 302, which scrolls the home screen in the direction 309 and visibly selects the calendar entry 310.

After selecting the calendar entry 307, the view screens on display interfaces 300-302 are changed to present the calendar in the Month view, as shown in Step 3. Further in Step 3, the user of the first mobile device selects the options tab 311 to reveal a pull-down menu 312, which provides different view options for the calendar. The user selects the Day view entry 313. After receiving the interface navigation instructions from the first mobile device and mapping those instructions to local interface navigation commands, the display interface 301 visually indicates selection of its options tab 314, which reveals a menu 315 of view options. The local interface navigation commands then visually select the Day view entry 316. Similarly, the local interface navigation commands for the mobile device with display interface 302 visually selects the options tab 317, revealing the pull-down menu 318, and selection of the Day view entry 319.

In Step 4, after selection of the Day view entry 313, which is mirrored on display interfaces 301-302, display interfaces 300-302 each visually display the calendar of the contacts manager application in the Day view screen 320-322, respectively. Thus, one set of user manipulations on display interface 300 of the first mobile device get mirrored onto the display interfaces 301-302 of the other mobile devices without any direct interactions with the display interfaces 301-302.

FIG. 4 is a functional block diagram illustrating example blocks executed to implement one aspect of the present disclosure from the perspective of a first mobile device in which the user of the first mobile device desires to cause mirrored interface navigation onto other mobile devices. In block 400, a communication link is established between a first mobile device and one or more other mobile devices. This communication link may be established using WWAN or WLAN communication protocols and may be a centralized link through a defined network or the internet, or may be an ad hoc P2P communication connection. Various means may be used to establish this link. For example, the user of the first device may execute a mirrored interface navigation application stored on the first mobile device. The executing application may provide the control of the communication functionality of the first mobile device to transmit communication requests and establish the link. The executing application may also provide for physical gestures or gestures in combination with proximity that establish the link. For example, each of the mobile devices that desire to be a part of the communication link may tap external cases. The sensors within the mobile devices may detect the physical impact and proximity of the other device and initiate the communication link. Various methods for establishing such a communication link may fall within the scope of the present disclosure.

In block 401, the first mobile device detects user interactions, in which the user interactions represent at least one interface navigation step. For example, the user of the first mobile device may manipulate the touch screen to activate a web browser and browse to a search engine website. The physical screen swipes and link activations will be detected as such interface navigational user interactions.

In block 402, the first user device transmits the detected user interactions to each of the other mobile devices connected to the communication link. These transmitted user interactions cause parallel or mirrored interface navigation interactions on the other mobile devices, such that the interface navigation progression experienced on the first mobile device will be translated to the other mobile devices without the users of the other mobile devices providing interface navigation input to do so. In various aspects of the present disclosure, the first mobile device may either first translate the detected interface navigational user interactions into a set of interface navigation commands compatible with the other mobile devices or it may simply transmit the interface navigation instructions that it uses to perform the interface navigations.

FIG. 5 is a functional block diagram illustrating example blocks executed to implement one aspect of the present disclosure from the perspective of one of the target mobile devices referred to in FIG. 4. In block 500, a communication link is established between the target mobile device and another mobile device. A request for communication is received from the other mobile device which prompts the target mobile device to establish the communication connection. Receipt of the request may cause the target mobile device to run a mirrored interface navigation application stored in memory. Data contained within the request may identify the mirrored interface navigation application for execution. The mirrored interface navigation application may even be downloaded in response to receiving the request for communication. Accordingly, the mirrored interface navigation application does not need to reside in memory of the target mobile device prior to the request for communication.

In block 501, the target mobile device receives at least one interface navigation instruction from the other mobile device. This interface navigation instruction may be an instruction that is not fully compatible with the target device, in which case the target mobile device accesses a lookup table to translate the received interface navigation instruction into a compatible local interface navigation instruction. This table may be a part of the mirrored interface navigation application or may be downloaded as needed when the target mobile device determines that the received interface navigation instruction is incompatible with its own operating system. The interface navigation instruction may, alternatively, be received in a format that is already compatible with the target device's operating system.

In block 502, the target mobile device executes the interface navigation instruction. Executing the interface navigation instruction causes the target mobile device to run the appropriate display animations to change the configuration or appearance of the display interface. Additionally, any actions caused by the interface navigation instructions, such as activating an internet connection with a web browser, activating another application, such as a calendar application, a utility application, and the like, are also performed.

It should be noted that in alternative aspects of the present disclosure, the instructing mobile device may send interface locking commands to the target devices, such that, while the mirrored interface navigation is being performed, the user at the target device may not directly provide input to the target device.

In block 503, in response to executing the interface navigation instructions, the target mobile device displays the visual interface navigation animations and elements in the display as if they were being directly input by the target mobile device user. Thus, the user in possession of the target mobile device observes the changes to the display as if the user were directly manipulating the user interface of the target mobile device. However, the interface navigation actions are being mirrored or performed in parallel with the user directly manipulating the interface of the other instructing mobile device.

Figure 6:
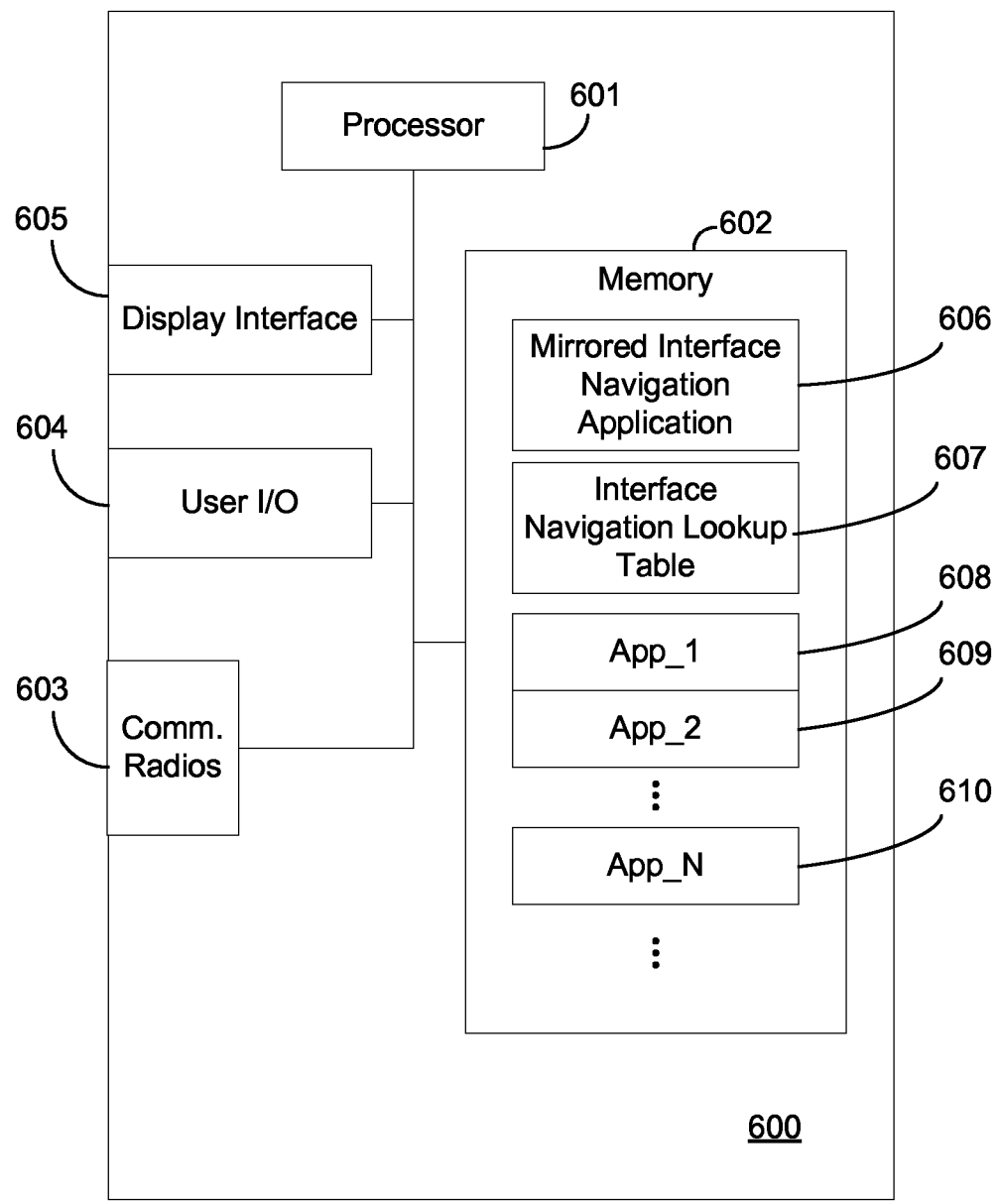
FIG. 6 is a block diagram illustrating a mobile device configured according to one aspect of the present disclosure.

FIG. 6 is a block diagram illustrating a mobile device 600 configured according to one aspect of the present disclosure. Mobile device 600 includes a processor 601 that controls and executes the functionalities and features provided by mobile device 600. Mobile device 600 may be any number of mobile electronic devices, including mobile phones, mobile computers, tablet computers, notebook, netbook, or laptop computers, and the like. Mobile device 600 includes memory 602, coupled to processor 601. Memory 602 contains various software, program code, data, and the like which the processor 601 may access and execute to implement any of the functions of mobile device 600. For example, memory 603 contains a mirrored interface navigation application 606, a interface navigation lookup table 607, and various application, application_1 608-application_N 610. Mobile device 600 includes communication capabilities through communication radios 603. Under control of processor 601, communication radios 603 send and receive data and voice signals over various types of wireless protocols. Communication radios 603 include multiple radios to facility communication of the various protocols, including WWAN communication, WLAN communications, such as WIFI™, BLUETOOTH®, WIFI™ Direct, BLUETOOTH® Low Energy (LE), ZIGBEE®, and the like.

In order to interact with users, user input/output (I/O) interface 604, under control of processor 601, provides means for a user to input information and output information. Such user I/O interface 604 may provide access to keyboards, microphones, speakers, touch screens, and the like. Display interface 604, under control of processor 600, is related to the user I/O interface 604, but provides the interface and control for displaying visual information to the user on a display of mobile device 600 (not shown) as well as receiving input from the user via touch screen technology. Under control of the processor 601, these various components of mobile device 600 provide multiple electronic and communication functions to a user.

A mirrored interface navigation application 606 is stored in memory 602. When executed by processor 601, the executing mirrored interface navigation application 606 causes the communication radios 603 to establish connection with other mobile devices intended for mirrored interface navigation. The combination of these components provides means for establishing a communication link between the mobile device 600 and one or more other mobile devices.

When a communication link is established, processor 601 controls user I/O interface 604 to capture the user's interactions with the mobile device 600. Within the context of the executing mirrored interface navigation application 606, these user interactions represent interface navigation interactions of the user. The combination of these components provides means for detecting user interactions in the mobile device 601, where the user interactions representing at least one interface navigation step.

After detecting and capturing the user's interactions, the executing mirrored interface navigation application 606, under control of the processor 601, transmits these interface navigation interactions using the communication radios 603. The combination of these components provides means for transmitting the detected user interactions to each of the other mobile devices. The transmitted user interactions then cause parallel interface navigation actions on the other mobile devices that corresponds to the at least one interface navigation step in the first mobile device.

Mobile device 600 may also be a target device in participating in a mirrored interface navigation session. In such instances, the processor 601 controls the communication radios 603 to establish a communication link with the other mobile device. The combination of these components provides means for establishing a communication link with a first device.

After establishing the communication connection, the processor 601 executes the mirrored interface navigation application 606, stored in memory 602. The executing application, in conjunction with the communication radios 603 receive various interface navigation instructions from the other device. The combination of these components provides means for receiving at least one interface navigation instruction from the first device.

The processor 601 executes the interface navigation instruction received. The combination of these components provides means for executing the at least one interface navigation instruction. On execution of the interface navigation instruction the processor 601 controls the user I/O interface 604 and display interface 605 to display the visual interface navigation elements and animations that correspond to the particular interface navigation instruction. The combination of these components provides means for displaying visual interface navigation elements in a display in response to the means for executing the interface navigation instruction. Thus, without user interaction at mobile device 600, interface navigation may visually occur based on the instructions received from the first device. The instructions mirror the interface navigation being directly performed on the other device.

In selected aspects of the present disclosure, mobile device 600, under control of processor 601, may access the interface navigation lookup table 607, stored in memory 602, in order to translate interface navigation instructions. When such mobile device 600 is leading the mirrored interface navigation session, then, in some aspects, the processor 601 may translate the interface navigation instructions that were captured and detected at mobile device 600 into interface navigation commands that are compatible with the other connected mobile devices. The processor 601 will then transmit those translated interface navigation commands using communication radios 603. When the mobile device 600 is a target device in the mirrored interface navigation session, if interface navigation instructions that are not compatible with the operating system of mobile device 600 are received at the communication radios, the processor 601 may access the interface navigation lookup table 607 to convert or map those instructions into local interface navigation commands that are compatible with its operating system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 5 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for mirrored interface navigation on a plurality of mobile devices, comprising:
   establishing, by a first mobile device of the plurality of mobile devices a communication link between the first mobile device and one or more other mobile devices of the plurality of mobile devices;
   establishing a screen mirroring session between the first mobile device and each of the one or more other mobile devices of the plurality of mobile devices via the communication links;
   transmitting interface locking signals from the first mobile device to each of the one or more other mobile devices, wherein the interface locking signals are configured to prohibit each of the one or more other mobile devices from manually receiving commands until the communication links established for the screen mirroring session are terminated;
   receiving, by the first mobile device, at least one command for execution to perform at least one user interface navigation operation; and
   in response to receiving the at least one command:
      executing, by the first mobile device, the at least one command to perform the at least one user interface navigation operation, wherein a graphical user interface (GUI) presented at a display of the first mobile device is updated as a result of execution of the at least one command;
      translating, by the first mobile device, the at least one command into one or more commands compatible with each mobile device of the one or more other mobile devices that is of a different device type than the first mobile device; and
      transmitting, by the first mobile device, command messages to each of the one or more other mobile devices, the command messages instructing each of the one or more other mobile devices to execute the at least one command to perform parallel user interface navigation operations at each of the one or more other mobile devices.

2. The method of claim 1, wherein the at least one command includes a scroll command corresponding to an input to scroll the GUI displayed at the first mobile device, wherein execution of the scroll command changes information presented within the GUI displayed at the first mobile device, and wherein updating the GUI as a result of execution of the scroll command includes animating the change in the information presented within the GUI.

3. The method of claim 2, wherein the at least one command includes a selection command corresponding to a selection of an element presented within the GUI, wherein said selection command is received after said scroll command, and wherein the command messages transmitted to each of the one or more other mobile devices instruct each of the one or more other mobile devices to execute both the scroll command and the selection command.

4. The method of claim 1, wherein the first mobile device transmits a first command message to each mobile device of the one or more other mobile devices that is of a same device type as the first mobile device and transmits a second command message to each mobile device of the one or more other mobile devices that is of the different device type, wherein the first command message includes the at least one command received by the first mobile device and the second command message includes the translated one or more commands.

5. The method of claim 1, wherein updating the GUI presented at the display of the first mobile device as a result of execution of the at least one command comprises presenting at least one new interface element at the display of the first mobile device.

6. The method of claim 1, further comprising terminating at least one communication link between the first mobile device and at least one mobile device of the one or more other mobile devices, wherein terminating the at least one communication link enables the at one mobile device of the one or more other mobile devices to manually receive commands.

7. An electronic apparatus comprising:
   means for establishing a communication link between a first mobile device of a plurality of mobile devices and one or more other mobile devices of the plurality of mobile devices;
   means for establishing a screen mirroring session between the first mobile device and each of the one or more other mobile devices of the plurality of mobile devices via the communication links;
   means for transmitting interface locking signals from the first mobile device to each of the one or more other mobile devices, wherein the interface locking signals are configured to prohibit each of the one or more other mobile devices from manually receiving commands until the communication links established for the screen mirroring session are terminated;
   means for receiving at least one command for execution to perform user interface navigation operation; and
   means for executing the at least one command to perform the at least one user interface navigation operation in response to receiving the at least one command, wherein a graphical user interface (GUI) presented at a display of the first mobile device is updated as a result of execution of the at least one command;
   means for translating the at least one command into one or more commands compatible with each mobile device of the one or more mobile devices that is of a different device type than the first mobile device in response to receiving the at least one command; and
   means for transmitting command messages to each of the one or more other mobile devices, the command messages instructing each of the one or more other mobile devices to execute the at least one command to perform parallel user interface navigation operations at each of the one or more other mobile devices.

8. The electronic apparatus of claim 7, wherein the at least one command includes a scroll command corresponding to an input to scroll the GUI displayed at the first mobile device, wherein execution of the scroll command changes information presented within the GUI displayed at the first mobile device, and wherein updating the GUI as a result of execution of the scroll command includes animating the change in the information presented within the GUI.

9. The electronic apparatus of claim 8, wherein the at least one command includes a selection command corresponding to a selection of an element presented within the GUI, wherein said selection command is received after said scroll command, and wherein the command messages transmitted to each of the one or more other mobile devices instruct each of the one or more other mobile devices to execute both the scroll command and the selection command.

10. The electronic apparatus of claim 7, wherein the first mobile device transmits a first command message to each mobile device of the one or more other mobile devices that is of a same device type as the first mobile device and transmits a second command message to each mobile device of the one or more other mobile devices that is of the different device type, wherein the first command message includes the at least one command received by the first mobile device and the second command message includes the translated one or more commands.

11. The electronic apparatus of claim 7, wherein updating the GUI presented at the display of the first mobile device as a result of execution of the at least one command comprises presenting at least one new interface element at the display of the first mobile device.

12. The electronic apparatus of claim 7, further comprising means for terminating at least one communication link between the first mobile device and at least one mobile device of the one or more other mobile devices, wherein terminating the at least one communication link enables the at one mobile device of the one or more other mobile devices to manually receive commands.

13. A non-transitory computer-readable medium having program code recorded thereon for mirrored interface navigation, wherein the program code-comprises:
 program code, executable by a first mobile device of a plurality of mobile devices, to establish a communication link between the first mobile device and one or more other mobile devices of the plurality of mobile devices;
 program code to establish a screen mirroring session between the first mobile device and each of the one or more other mobile devices of the plurality of mobile devices via the communication links;
 program code to transmit interface locking signals from the first mobile device to each of the one or more other mobile devices, wherein the interface locking signals are configured to prohibit each of the one or more other mobile devices from manually receiving commands until the communication links established for the screen mirroring session are terminated;
 program code, executable by the first mobile device, to receive at least one command for execution by the first mobile device to perform at least one user interface navigation operation;
 program code, executable by the first mobile device, to execute the at least one command to perform at least one user interface navigation operation in response to receiving the at least one command, wherein a graphical user interface (GUI) presented at a display of the first mobile device is updated as a result of execution of the at least one command;
 program code to translate the at least one command into one or more commands compatible with each mobile device of the one or more other mobile devices that is of a different devices type than the first mobile device in response to receiving the at least one command; and
 program code, executable by the first mobile device, to transmit command messages to each of the one or more other mobile devices in response to receiving the at least one command, the command messages instructing each of the one or more other mobile devices to execute the at least one command to perform parallel user interface navigation operations at each of the one or more other mobile devices.

14. The non-transitory computer-readable medium of claim 13, wherein the at least one command includes a scroll command corresponding to an input to scroll the GUI displayed at the first mobile device, wherein execution of the scroll command changes information presented within the GUI displayed at the first mobile device, and wherein updating the GUI as a result of execution of the scroll command includes animating the change in the information presented within the GUI.

15. The non-transitory computer-readable medium of claim 14, wherein the at least one command includes a selection command corresponding to a selection of an element presented within the GUI, wherein said selection command is received after said scroll command, and wherein the command messages transmitted to each of the one or more other mobile devices instruct each of the one or more other mobile devices to execute both the scroll command and the selection command.

16. The non-transitory computer-readable medium of claim 13, wherein the first mobile device transmits a first command message to each mobile device of the one or more other mobile devices that is of a same device type as the first mobile device and transmits a second command message to each mobile device of the one or more other mobile devices that is of the different device type, wherein the first command message includes the at least one command received by the first mobile device and the second command message includes the translated one or more commands.

17. The non-transitory computer-readable medium of claim 13, wherein updating the GUI presented at the display of the first mobile device as a result of execution of the at least one command comprises presenting at least one new interface element at the display of the first mobile device.

18. The non-transitory computer-readable medium of claim 13, further comprising means for terminating at least one communication link between the first mobile device and at least one mobile device of the one or more other mobile devices, wherein terminating the at least one communication link enables the at one mobile device of the one or more other mobile devices to manually receive commands.

19. An electronic apparatus comprising:
 at least one processor;
 a memory coupled to the at least one processor; and
 a display device coupled to the at least one processor;
 wherein the at least one processor is configured:
  to establish, by a first mobile device of a plurality of mobile devices, a communication link between the first mobile device and one or more other mobile devices of the plurality of mobile devices;
  to establish a screen mirroring session between the first mobile device and each of the one or more other mobile devices of the plurality of mobile devices via the communication links; and
  to transmit interface locking signals from the first mobile device to each of the one or more other mobile devices, wherein the interface locking signals are configured to prohibit each of the one or more other mobile devices from manually receiving commands until the communication links established for the screen mirroring session are terminated;
  to receive at least one command for execution by the first mobile device to perform at least one user interface navigation operation; and
  to, in response to receiving the at least one command:
   execute the at least one-command to perform the at least one user interface navigation operation, wherein a graphical user interface (GUI) presented at a display of the first mobile device is updated as a result of execution of the at least one command;

translate the at least one command into one or more commands compatible with each mobile device of the one or more other mobile devices that is of a different device type than the first mobile device; and transmit command messages to each of the one or more other mobile devices, the command messages instructing each of the one or more other mobile devices to execute the at least one command to perform parallel user interface navigation operations at each of the one or more other mobile devices.

20. The electronic apparatus of claim 19, wherein the at least one command includes a scroll command corresponding to an input to scroll the GUI displayed at the first mobile device, wherein execution of the scroll command changes information presented within the GUI displayed at the first mobile device, and wherein updating the GUI as a result of execution of the scroll command includes animating the change in the information presented within the GUI.

21. The electronic apparatus of claim 20 wherein the at least one command includes a selection command corresponding to a selection of an element presented within the GUI, wherein said selection command is received after said scroll command, and wherein the command messages transmitted to each of the one or more other mobile devices instruct each of the one or more other mobile devices to execute both the scroll command and the selection command.

22. The electronic apparatus of claim 19, wherein the first mobile device transmits a first command message to each mobile device of the one or more other mobile devices that is of a same device type as the first mobile device and transmits a second command message to each mobile device of the one or more other mobile devices that is of the different device type, wherein the first command message includes the at least one command received by the first mobile device and the second command message includes the translated one or more commands.

23. The electronic apparatus of claim 19, wherein updating the GUI presented at the display of the first mobile device as a result of execution of the at least one command comprises presenting at least one new interface element at the display of the first mobile device.

24. The electronic apparatus of claim 19, further comprising means for terminating at least one communication link between the first mobile device and at least one mobile device of the one or more other mobile devices, wherein terminating the at least one communication link enables the at one mobile device of the one or more other mobile devices to manually receive commands.

* * * * *